United States Patent
Yamamoto (10) Patent No.: US 9,515,564 B2
(45) Date of Patent: Dec. 6, 2016

(54) POWER CONVERSION APPARATUS AND POWER CONVERSION METHOD BASED ON A CONTROL CONSTANT AND A FEEDBACK VALUE BASED ON CURRENT FLOW

(71) Applicant: TOYOTA JIDOSHA KABUSHIKI KAISHA, Toyota-shi, Aichi-ken (JP)

(72) Inventor: Takuya Yamamoto, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/550,352

(22) Filed: Nov. 21, 2014

(65) Prior Publication Data
US 2015/0146456 A1 May 28, 2015

(30) Foreign Application Priority Data
Nov. 27, 2013 (JP) ................... 2013-245385

(51) Int. Cl.
*H02M 3/337* (2006.01)
*H02M 3/335* (2006.01)

(52) U.S. Cl.
CPC ....... *H02M 3/3378* (2013.01); *H02M 3/33576* (2013.01); *H02M 3/33546* (2013.01); *H02M 3/33553* (2013.01)

(58) Field of Classification Search
CPC ............ H02M 3/33546; H02M 3/3378; H02M 3/33576; H02M 3/33553
See application file for complete search history.

(56) References Cited

U.S. PATENT DOCUMENTS

| | | | |
|---|---|---|---|
| 2007/0236200 A1 | 10/2007 | Canfield et al. | |
| 2009/0034509 A1* | 2/2009 | Krapp | H04Q 11/0421 370/352 |
| 2009/0306914 A1 | 12/2009 | Cohen | |
| 2010/0066327 A1 | 3/2010 | Chen et al. | |
| 2011/0198933 A1* | 8/2011 | Ishigaki | B60R 25/00 307/66 |
| 2012/0169310 A1 | 7/2012 | Dearborn et al. | |
| 2012/0235507 A1* | 9/2012 | Choi | H02J 5/005 307/104 |

FOREIGN PATENT DOCUMENTS

| | | |
|---|---|---|
| DE | 69814580 T2 | 4/2004 |
| JP | 2011-193713 A | 9/2011 |
| JP | 2012-095442 A | 5/2012 |
| JP | 5128696 B1 | 1/2013 |
| JP | 2013-059200 A | 3/2013 |
| WO | 99/04482 A1 | 1/1999 |

* cited by examiner

*Primary Examiner* — Jue Zhang
*Assistant Examiner* — Lakaisha Jackson
(74) *Attorney, Agent, or Firm* — Sughrue Mion, PLLC (57) ABSTRACT

A power conversion apparatus includes a primary side circuit having a primary side port; a secondary side circuit having a secondary side port; and a control unit that derives a control constant suitable for a feedback value according to a relationship rule between the feedback value and the control constant, and adjusts a phase difference between the primary side circuit and the secondary side circuit using the control constant that is derived from the relationship rule, so as to control transmitted power that is transmitted between the primary side circuit and the secondary side circuit, wherein the feedback value is obtained based on current flowing to the primary side port or the secondary side port.

11 Claims, 6 Drawing Sheets

POWER CONVERSION APPARATUS AND POWER CONVERSION METHOD BASED ON A CONTROL CONSTANT AND A FEEDBACK VALUE BASED ON CURRENT FLOW

INCORPORATION BY REFERENCE

The disclosure of Japanese Patent Application No. 2013-245385 filed on Nov. 27, 2013 including the specification, drawings and abstract is incorporated herein by reference in its entirety.

BACKGROUND OF THE INVENTION

1. Field of the Invention

The present invention relates to a technique for converting power.

2. Description of Related Art

A power conversion apparatus for converting power between a primary side port of a primary side circuit and a secondary side port of a secondary side circuit is known (see Japanese Patent Application Publication No. 2011-193713 (JP 2011-193713 A), for example). The power conversion apparatus adjusts a phase difference ϕ between the primary side circuit and the secondary side circuit by feeding back transmitted power $P_{DD}$ transmitted between the primary side circuit and the secondary side circuit in such a manner that the transmitted power $P_{DD}$ becomes command transmitted power $P_{DD}*$.

SUMMARY OF THE INVENTION

However, in the feedback disclosed in JP 2011-193713, since a target value of current flowing to a port is not determined, if the current flowing to the port is greatly changed, it may be difficult to control the transmitted power with high accuracy. Therefore, the present invention provides a power conversion apparatus and a power conversion method which enable to control the transmitted power with high accuracy.

According to one aspect of the present invention, there is provided a power conversion apparatus including: a primary side circuit having a primary side port; a secondary side circuit having a secondary side port; and a control unit that derives a control constant suitable for a feedback value according to a relationship rule between the feedback value and the control constant, and adjusts a phase difference between the primary side circuit and the secondary side circuit using the control constant that is derived from the relationship rule, so as to control transmitted power that is transmitted between the primary side circuit and the secondary side circuit, the feedback value being obtained based on current flowing to the primary side port or the secondary side port.

According to one embodiment, it is capable of controlling the transmitted power with high accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Configuration of Power Supply Apparatus 101>

Figure 1:
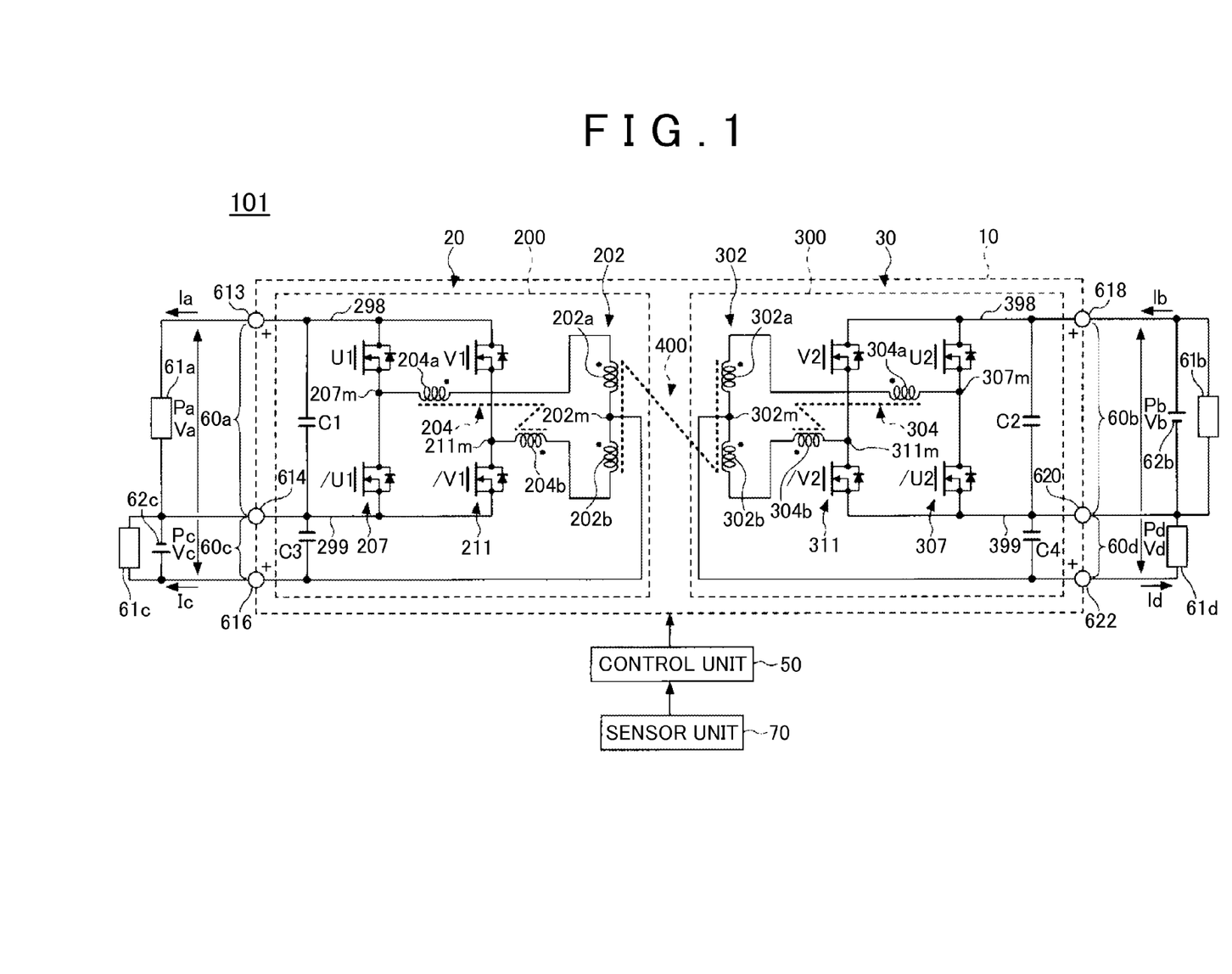
FIG. 1 is a diagram showing an example of a configuration of a power conversion apparatus.

FIG. 1 is a block diagram showing an example of a configuration of a power supply apparatus 101 which is an embodiment of a power conversion apparatus.

For example, the power supply apparatus 101 is a power supply system that includes a power supply circuit 10, a control unit 50 and a sensor unit 70. For example, the power supply apparatus 101 is a system that is mounted on a vehicle such as an automobile, and distributes power to various loads of the vehicle. A hybrid vehicle, a plug-in hybrid vehicle, an electric vehicle, and so on may be cited as specific examples of this vehicle. The power supply apparatus 101 may also be mounted on a vehicle using an engine as a driving source.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped down by a secondary side conversion circuit 30 provided in the power supply circuit 10 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply circuit 10 is a power conversion circuit that includes the four input/output ports described above and has functions for selecting any two input/output ports from the four input/output ports and performing power conversion between the two input/output ports. Further, the power supply apparatus 101 including the power supply circuit 10 may be an apparatus that includes a plurality of, at least three, input/output ports, and is capable of converting power between any two input/output ports from the plurality of, at least three, input/output ports. For example, the power supply circuit 10 may also be a circuit that has three input/output ports without the fourth input/output port 60d.

Port powers Pa, Pc, Pb, Pd are input/output powers (input powers or output powers) of the first input/output port 60a, the second input/output port 60c, the third input/output port 60b, and the fourth input/output port 60d, respectively. Port voltages Va, Vc, Vb, Vd are input/output voltages (input voltages or output voltages) of the first input/output port 60a, the second input/output port 60c, the third input/output port 60b, and the fourth input/output port 60d, respectively. Port currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. Further, the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer). The primary side ports configured of the first input/output port 60a and the second input/output port 60c and the secondary side ports configured of the third input/output port 60b and the fourth input/output port 60d are connected via the transformer 400.

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm /U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm /U1 ON and OFF. Further, a primary side second arm circuit 211 connecting the primary side second upper arm V1 and the primary side second lower arm /V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60*a* is a port provided between the primary side positive electrode bus line 298 and the primary side negative electrode bus line 299. The first input/output port 60*a* is configured to include the terminal 613 and the terminal 614.

The second input/output port 60*c* is a port provided between the primary side negative electrode bus line 299 and a center tap 202*m* of the primary side coil 202. The second input/output port 60*c* is configured to include the terminal 614 and the terminal 616.

The center tap 202*m* is connected to the high potential side terminal 616 of the second input/output port 60*c*. The center tap 202*m* is an intermediate connection point between a primary side first winding 202*a* and a primary side second winding 202*b* constituting the primary side coil 202.

The secondary side conversion circuit 30 is a secondary side circuit configured to include a secondary side full bridge circuit 300, the third input/output port 60*b*, and the fourth input/output port 60*d*. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminal 618 of the third input/output port 60*b*, and a secondary side negative electrode bus line 399 connected to the low potential side terminal 620 of the third input/output port 60*b* and the fourth input/output port 60*d*.

A secondary side first arm circuit 307 connecting the secondary side first upper arm U2 and the secondary side first lower arm /U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm /U2 ON and OFF. Further, a secondary side second arm circuit 311 connecting the secondary side second upper arm V2 and the secondary side second lower arm /V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm /V2 ON and OFF.

The secondary side coil 302 and the secondary side magnetic coupling reactor 304 are provided in a bridge part connecting a midpoint 307*m* of the secondary side first arm circuit 307 to a midpoint 311*m* of the secondary side second arm circuit 311. To describe connection relationships to the bridge part in more detail, one end of a secondary side first reactor 304*a* of the secondary side magnetic coupling reactor 304 is connected to the midpoint 307*m* of the secondary side first arm circuit 307, and one end of the secondary side coil 302 is connected to another end of the secondary side first reactor 304*a*. Further, one end of a secondary side second reactor 304*b* of the secondary side magnetic coupling reactor 304 is connected to another end of the secondary side coil 302, and another end of the secondary side second reactor 304*b* is connected to the midpoint 311*m* of the secondary side second arm circuit 311. Note that the secondary side magnetic coupling reactor 304 is configured to include the secondary side first reactor 304*a* and the secondary side second reactor 304*b*, which is magnetically coupled to the secondary side first reactor 304*a* by a coupling coefficient $k_2$.

The midpoint 307*m* is a secondary side first intermediate node between the secondary side first upper arm U2 and the secondary side first lower arm /U2, and the midpoint 311*m* is a secondary side second intermediate node between the secondary side second upper arm V2 and the secondary side second lower arm /V2.

The third input/output port 60*b* is a port provided between the secondary side positive electrode bus line 398 and the secondary side negative electrode bus line 399. The third input/output port 60*b* is configured to include the terminal 618 and the terminal 620. The fourth input/output port 60*d* is a port provided between the secondary side negative electrode bus line 399 and a center tap 302*m* of the secondary side coil 302. The fourth input/output port 60*d* is configured to include the terminal 620 and the terminal 622.

The center tap 302*m* is connected to the high potential side terminal 622 of the fourth input/output port 60*d*. The center tap 302*m* is an intermediate connection point between a secondary side. first winding 302*a* and a secondary side second winding 302*b* constituting the secondary side coil 302.

In FIG. 1, the power supply apparatus 101 includes the sensor unit 70. The sensor unit 70 serves as detecting means that detects an input/output value Y of at least one of the first to fourth input/output ports 60*a*, 60*c*, 60*b*, 60*d* at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60*a*, 60*c*, 60*b*, 60*d*. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60a, 60c, 60b, 60d converges to a target value Yo set in the port. For example, the target value Yo is a command value set by the control unit 50 or a predetermined apparatus other than the control unit 50 on the basis of driving conditions defined in relation to the respective loads (the primary side low voltage system load 61c and so on, for example) connected to the input/output ports. The target value Yo functions as an output target value when power is output from the port and an input target value when power is input into the port, and may be a target voltage value, a target current value, or a target power value.

Further, the control unit 50 feedback-controls the power conversion operation performed by the power supply circuit 10 such that a transmitted power P transmitted between the primary side conversion circuit 20 and the secondary side conversion circuit 30 via the transformer 400 converges to a set target transmitted power Po. The transmitted power will also be referred to as power transmission amount. The target transmitted power will also be referred to as command transmitted power.

The control unit 50 feedback-controls the power conversion operation performed by the power supply circuit 10 by varying a value of a predetermined control parameter X, and is thus capable of adjusting the respective input/output values Y of the first to fourth input/output ports 60a, 60c, 60b, 60d of the power supply circuit 10. Two control variables, namely a phase difference φ and a duty ratio D (an ON time δ) are used as the main control parameters X.

The phase difference φ is a deviation (a time lag) between switching timings of identical-phase power conversion circuit units of the primary side full bridge circuit 200 and the secondary side full bridge circuit 300. The duty ratio D (the ON time δ) is a duty ratio (an ON time) between switching waveforms of the respective power conversion circuit units constituting the primary side full bridge circuit 200 and the secondary side full bridge circuit 300.

The two control parameters X can be controlled independently of each other. The control unit 50 varies the input/output values Y of the respective input/output ports of the power supply circuit 10 by performing duty ratio control and/or phase control on the primary side full bridge circuit 200 and the secondary side full bridge circuit 300 using the phase difference φ and the duty ratio D (the ON time δ).

Figure 2:
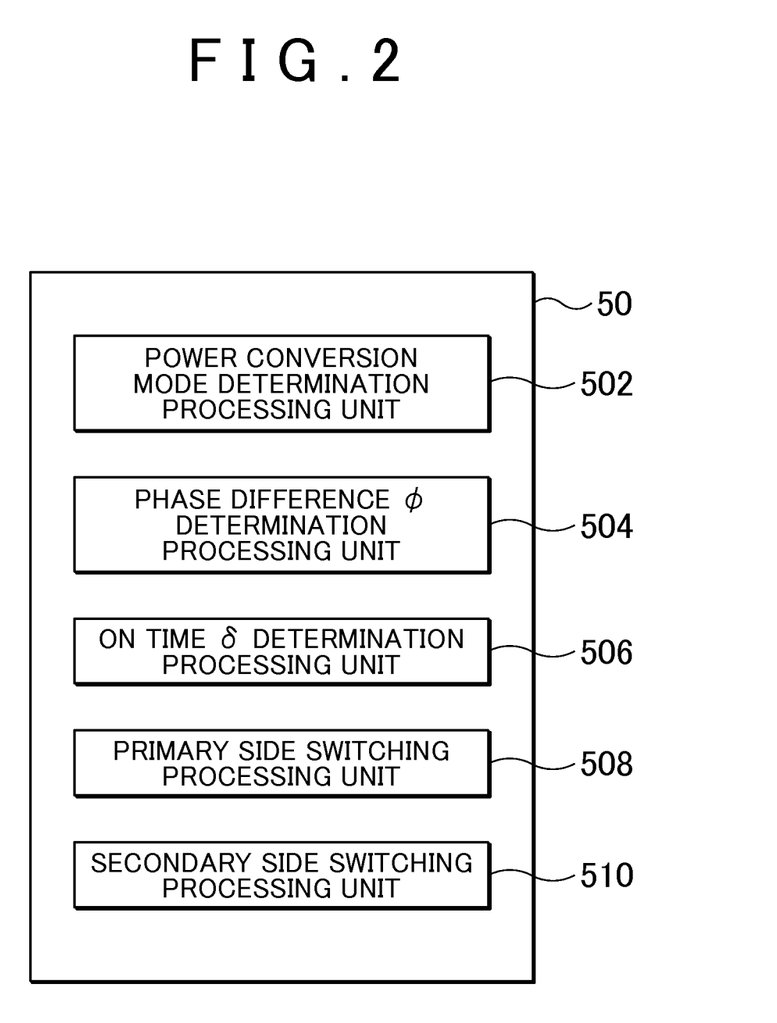
FIG. 2 is a diagram showing an example of a configuration of a control unit.

FIG. 2 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference φ determination processing unit 504, an ON time δ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Yo in one of the ports). As regards the power conversion modes, in mode A, power input from the first input/output port 60a is converted and output to the second input/output port 60c. In mode B, power input from the first input/output port 60a is converted and output to the third input/output port 60b. In mode C, power input from the first input/output port 60a is converted and output to the fourth input/output port 60d.

In mode D, power input from the second input/output port 60c is converted and output to the first input/output port 60a. In mode E, power input from the second input/output port 60c is converted and output to the third input/output port 60b. In mode F, power input from the second input/output port 60c is converted and output to the fourth input/output port 60d.

In mode G, power input from the third input/output port 60b is converted and output to the first input/output port 60a. In mode H, power input from the third input/output port 60b is converted and output to the second input/output port 60c. In mode I, power input from the third input/output port 60b is converted and output to the fourth input/output port 60d.

In mode J, power input from the fourth input/output port 60d is converted and output to the first input/output port 60a. In mode K, power input from the fourth input/output port 60d is converted and output to the second input/output port 60c. In mode L, power input from the fourth input/output port 60d is converted and output to the third input/output port 60b.

The phase difference φ determination processing unit 504 has a function for setting a phase difference φ between switching period motions of the switching elements between the primary side conversion circuit 20 and the secondary side conversion circuit 30 in order to cause the power supply circuit 10 to function as a direct current-direct current (DC-DC) converter circuit.

The ON time δ determination processing unit 506 has a function for setting an ON time δ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by. the primary side first upper arm U1, the primary side first lower arm /U1, the primary side second upper arm V1, and the primary side second lower arm /V1, on the basis of outputs of the power conversion mode determination processing unit 502, the phase difference φ determination processing unit 504, and the ON time δ determination processing unit 506.

The secondary side switching processing unit 510 has a function for performing switching control on the respective switching elements constituted by the secondary side first upper arm U2, the secondary side first lower arm /U2, the secondary side second upper arm V2, and the secondary side second lower arm /V2, on the basis of the outputs of the power conversion mode determination processing unit 502, the phase difference φ determination processing unit 504, and the ON time δ determination processing unit 506.

<Operation of Power Supply Apparatus 101>

An operation of the power supply apparatus 101 having the above configuration will now be described using FIGS. 1 and 2. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a voltage input into the second input/output port 60c is stepped up by a step-up function of the primary side conversion circuit 20, whereupon power having the stepped-up voltage is transmitted to the third input/output port 60b side by a DC-DC converter circuit function of the power supply circuit 10, stepped down by a step-down function of the secondary side conversion circuit 30, and then output from the fourth input/output port 60d.

Here, a step-up/step-down function of the primary side conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled by a coupling coefficient $k_T$, the transformer 400 functions as a center tapped transformer having a number of windings 1:N. Hence, by adjusting the phase difference φ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 3:
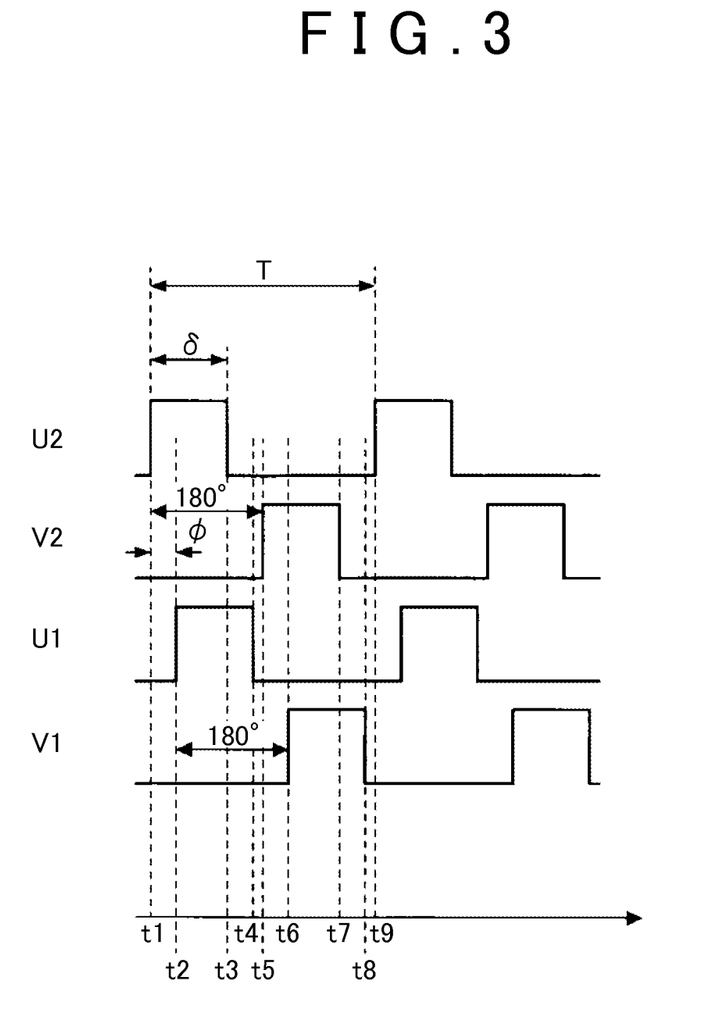
FIG. 3 is a timing chart showing an example of switching operations of a primary side circuit and a secondary side circuit.

FIG. 3 is a view showing a timing chart of ON/OFF switching waveforms of the respective arms provided in the power supply circuit 10 resulting from control executed by the control unit 50. In FIG. 3, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arm /U1, the primary side second lower arm /V1, the secondary side first lower arm /U2, and the secondary side second lower arm /V2 are inverted waveforms (not shown) obtained by respectively inverting the ON/OFF waveforms of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 3, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 make the respective ON times δ of U1, 1, U2, and V2 equal to each other (respective ON times δ=primary side ON time δ11=secondary side ON time δ12=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time δ. The step-up/step-down ratio of the primary side conversion circuit 20 is a transformation ratio between the first input/output port 60a and the second input/output port 60c, while the step-up/step-down ratio of the secondary side conversion circuit 30 is a transformation ratio between the third input/output port 60b and the fourth input/output port 60d.

Therefore, for example, it is expressed as: the step-up/step-down ratio of the primary side conversion circuit 20=the voltage of the second input/output port 60c/the voltage of the first input/output port 60a=δ11/T=α/T, and the step-up/step-down ratio of the secondary side conversion circuit 30=the voltage of the fourth input/output port 60d/the voltage of the third input/output port 60b=δ12/T=α/T. In other words, the respective step-up/step-down ratios of the primary side conversion circuit 20 and the secondary side conversion circuit 30 take identical values (=α/T).

Note that the ON time δ in FIG. 3 represents both the ON time 811 of the primary side first upper arm U11 and the primary side second upper arm V1 and the ON time δ12 of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees (π, and a phase difference between U2 and V2 is likewise activated at 180 degrees (π). Moreover, by changing the phase difference φ between U1 and U2, the power transmission amount P between the primary side conversion circuit 20 and the secondary side conversion circuit 30 can be adjusted such that when the phase difference φ>0, power can be transmitted from the primary side conversion circuit 20 to the secondary side conversion circuit 30, and when the phase difference φ<0, power can be transmitted from the secondary side conversion circuit 30 to the primary side conversion circuit 20.

The phase difference φ is a deviation (a time lag) between the switching timings of identical-phase power conversion circuit units of the primary side full bridge circuit 200 and the secondary side full bridge circuit 300. For example, the phase difference φ is a deviation between the switching timings of the primary side first arm circuit 207 and the secondary side first arm circuit 307, and a deviation between the switching timings of the primary side second arm circuit 211 and the secondary side second arm circuit 311. These deviations are controlled to be equal to each other. In other words, the phase difference φ between U1 and U2 and the phase difference φ between V1 and V2 are controlled to identical values.

Hence, when, for example, an external signal requesting an operation in which the power conversion mode of the power supply circuit 10 is set at mode F is input, the power conversion mode determination processing unit 502 selects and sets mode F. The ON time δ determination processing unit 506 then sets the ON time δ to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined in accordance with the ON time δ set by the ON time δ determination processing unit 506, and outputs the stepped-down voltage to the fourth input/output port 60d. Further, the phase difference φ determination processing unit 504 sets the phase difference φ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm /U1, the primary side second upper arm V1, and the primary side second lower arm /V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm /U2, the secondary side second upper arm V2, and the secondary side second lower arm /V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 in accordance with the phase difference φ is power transmitted from one of the primary side conversion circuit 20 and the secondary side conversion circuit 30 to the other via the transformer 400, and is expressed as $$P(N \times Va \times Vb)/(\pi \times \omega \times L) \times F(D, \phi) \qquad \text{Equation 1}$$

Further, N is a winding ratio of the transformer 400, Va is the input/output voltage of the first input/output port 60a, Vb is the input/output voltage of the third input/output port 60b, π is pi, ω (=2π×f=2π/T) is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

<Power Feedback Control>

Figure 4:
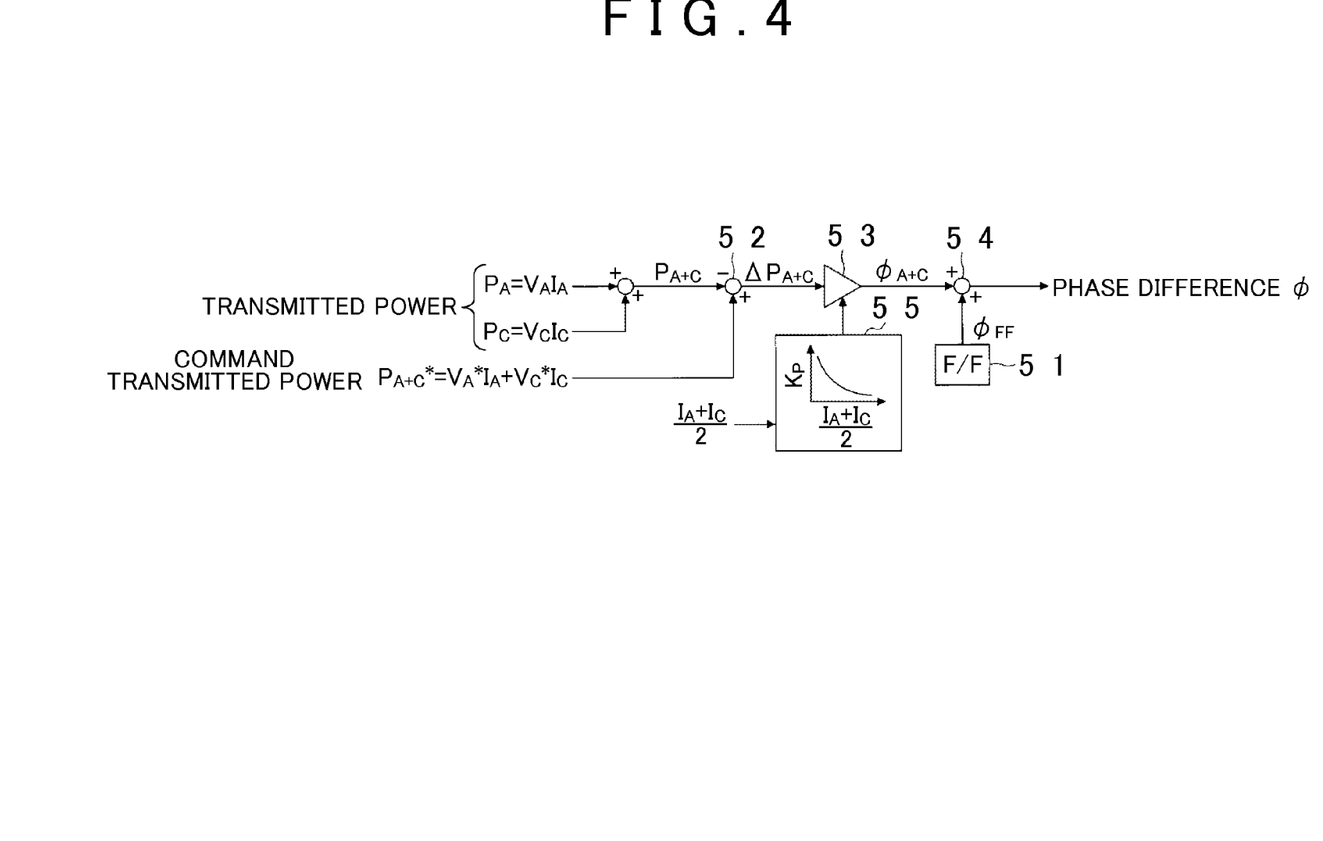
FIG. 4 is a diagram showing a first configuration example of a power feedback control system.

FIG. 4 is a diagram showing a first configuration example of a power feedback control system for adjusting the phase difference φ by feeding back transmitted power $P_{A+C}$ that is transmitted to the first input/output port 60a and the second input/output port 60c from the third input/output port 60b in such a manner that the transmitted power $P_{A+C}$ becomes command transmitted power $P_{A+C}^*$. The control unit 50 executes a power conversion method for controlling the transmitted power $P_{A+C}$ by adjusting the phase difference ϕ based on the power feedback control system shown in FIG. 4.

The transmitted power $P_{A+C}$ is power transmitted to the primary side conversion circuit 20 from the secondary side conversion circuit 30 via the transformer 400, and is equal to the sum of transmitted power $P_A$ that is transmitted to the first input/output port 60a and transmitted power $P_C$ that is transmitted to the second input/output port 60c. The transmitted power $P_A$ is equal to the product of a detected voltage value $V_A$ of the port voltage Va output from the first input/output port 60a and a detected current value $I_A$ of the port current Ia output from the first input/output port 60a. The transmitted power $P_C$ is equal to the product of a detected voltage value $V_C$ of the port voltage Vc output from the second input/output port 60c and a detected current value $I_C$ of the port current Ic output from the second input/output port 60c.

The control unit 50 has a feed forward unit 51, a subtraction unit 52, a control calculation unit 53, and an addition unit 54.

The feed forward unit 51 generates a control center value $\phi_{FF}$ for transmitting the phase difference ϕ of the command transmitted power $P_{A+C}^*$. For example, the feed forward unit 51 generates the control center value $\phi_{FF}$ corresponding to the command transmitted power $P_{A+C}^*$ based on the above Equation 1.

The subtraction unit 52 calculates a deviation $\Delta P_{A+C}$ between the command transmitted power $P_{A+C}^*$ and the transmitted power $P_{A+C}$ that is feedback input to the control unit 50.

The control calculation unit 53 performs a proportional control (P control) of deriving an adjustment reference value $\phi_{A+C}$ of the phase difference ϕ by multiplying the deviation $\Delta P_{A+C}$ by a proportional gain $K_P$. The proportional gain $K_P$ is a control constant to be multiplied by the deviation $\Delta P_{A+C}$, and is a proportional constant used for a proportional operation (P operation) of changing the phase difference ϕ by changing the adjustment reference value $\phi_{A+C}$ in proportion to the deviation $\Delta P_{A+C}$.

The control calculation unit 53 may also perform a PI control that is a combination of the above proportional operation of changing the phase difference ϕ in proportion to the deviation $\Delta P_{A+C}$ and an integral operation (I operation) of changing the phase difference ϕ by changing the adjustment reference value $\phi_{A+C}$ in proportion to integral of the deviation $\Delta P_{A+C}$. Further, the control calculation unit 53 may also perform a PID control that is a combination of the proportional operation and the integral operation of the PI control and a derivative operation (D operation) of changing the phase difference ϕ by changing the adjustment reference value $\phi_{A+C}$ in proportion to derivative of the deviation $\Delta P_{A+C}$.

The addition unit 54 determines a new phase difference ϕ by adding the control center value $\phi_{FF}$ and the adjustment reference value $\phi_{A+C}$. That is, it is possible to adjust the phase difference ϕ.

In the case of FIG. 4, a target value of the port current Ia flowing to the first input/output port 60a and a target value of the port current Ic flowing to the second input/output port 60c are not determined. Therefore, the command transmitted power $P_{A+C}^*$ uses the detected current values $I_A$, $I_C$ in the same manner as the transmitted power $P_A$, $P_C$ that is feedback input to the control unit 50. That is, in FIG. 4, the command transmitted power $P_{A+C}^*$ is defined by the sum of the product of the target voltage value $V_A^*$ and the detected current value $I_A$ and the product of the target voltage value $V_C^*$ and the detected current value $I_C$. The target voltage value $V_A^*$ is a voltage value (for example, 48V) that is set in a working voltage range of the first input/output port 60a, and the target voltage value $V_C^*$ is a voltage value (for example, 12V) that is set in a working voltage range of the second input/output port 60c.

Therefore, in the case of FIG. 4, the deviation $\Delta P_{A+C}$ is calculated as $\Delta P_{A+C}=(V_A^*I_A+V_C^*I_C)-(V_AI_A+V_CI_C)=(V_A^*-V_A)I_A+(V_C^*-V_C)I_C=\Delta V_AI_A+\Delta V_CI_C$. That is, with respect to current, rather than the current deviations of the first input/output port 60a and the second input/output port 60c, the detected current values $I_A$, $I_C$ are used in calculation of the proportional control performed by the control calculation unit 53 as they are.

In the case of setting a proportional gain of a proportional term in the calculation of the proportional control to $K_P$, the proportional term is expressed as $(\Delta V_AI_A+\Delta V_CI_C)K_P=\Delta V_AI_AK_P+\Delta V_CI_CK_P$. In other words, the phase difference ϕ is calculated based on the product $I_AK_P$ of the current detected current value $I_A$ of the first input/output port 60a and the proportional gain $K_P$ and the product $I_CK_P$ of the current detected current value $I_C$ of the second input/output port 60c and the proportional gain $K_P$.

However, if it is assumed that the proportional gain $K_P$ is a fixed value, when the port current Ia flowing to the first input/output port 60a or the port current Ic flowing to the second input/output port 60c is greatly changed, it is difficult to control the transmitted power $P_{A+C}$ to follow the command transmitted power $P_{A+C}^*$ with high accuracy. This is because that if a current value of port current is low, the proportional gain $K_P$ is required to be higher than the case that the current value of the port current is high, and if the current value of the port current is high, the proportional gain $K_P$ is require to be lower than the case that the current value of the port current is low.

Therefore, the control unit 50 derives a control constant suitable for a feedback value that is obtained based on the port current Ia and the port current Ic from a relationship rule that defines a relationship between the feedback value and the control constant. Then, the control unit 50 adjusts the phase difference using the control constant that is derived from the relationship rule, so as to perform control of making the transmitted power $P_{A+C}$ follow the command transmitted power $P_{A+C}^*$. By adjusting the phase difference ϕ using the control constant that is derived in this way, even when the port current flowing to the port is greatly changed, it is possible to adjust the phase difference ϕ by using a control constant of the port current that is most suitable at this time, so as to make the transmitted power $P_{A+C}$ follow the command transmitted power $P_{A+C}^*$. As a result, even when the port current flowing to the port is greatly changed, it is possible for the control unit 50 to make the transmitted power $P_{A+C}$ follow the command transmitted power $P_{A+C}^*$ with high accuracy.

An example of the control performed by the control calculation unit 53 is shown in FIG. 4, which adjusts the phase difference ϕ by deriving the proportional gain $K_P$ from a gain map 55 and utilizing adjustment of the adjustment reference value $\phi_{A+C}$ using the proportional gain $K_P$ that is derived from the gain map 55, so as to make the transmitted power $P_{A+C}$ follow the command transmitted power $P_{A+C}^*$. $(I_A+I_C)/2$ is an example of the feedback value obtained based on the port current Ia and the port current Ic, and is an arithmetic average value of the detected current value $I_A$ and the detected current value $I_C$. The proportional gain $K_P$ is an example of the control constant corresponding to the feedback value obtained based on the port current Ia and the port current Ic. The gain map 55 is an example of the relationship rule that defines the relationship between the feedback value and the control constant.

Further, the feedback value in this case is not limited to the arithmetic average value of the detected current value $I_A$ and the detected current value $I_C$, and may also be an average value such as a weighted average value of the detected current value $I_A$ and the detected current value $I_C$, for example.

In this way, the control calculation unit 53 perform a proportional operation (P operation) of changing the phase difference ϕ by changing the adjustment reference value ϕ$_{A+C}$ in proportion to the deviation ΔP$_{A+C}$ using the proportional gain $K_P$ that is derived from the gain map 55. That is, the control unit 50 can adjust the phase difference ϕ to make the transmitted power P$_{A+C}$ follow the command transmitted power P$_{A+C}$*.

The gain map 55 is created in advance to enable the proportional gain $K_P$ to be derived which can make the transmitted power P$_{A+c}$ follow the command transmitted power P$_{A+C}$* with desired high accuracy in a manner of corresponding to each value that may be taken by $(I_A+I_C)/2$, and stored in advance in a storage apparatus accessible by the control unit 50. The proportional gain $K_P$ is stored in the storage apparatus such that the larger $(I_A+I_C)/2$ is the smaller a value to be derived from the gain map 55 is.

For example, the proportional gain $K_P$ which can make the transmitted power P$_{A+C}$ follow the command transmitted power P$_{A+C}$* with desired high accuracy is measured in advance for each value that may be taken by $(I_A+I_C)/2$ in a design stage of the power supply circuit 10 or a procedure of checking the power supply circuit 10 manufactured in a factory. Moreover, the gain map 55 that is configured by making the measured proportional gain $K_P$ correspond to each value of $(I_A+I_C)/2$ is stored in the storage apparatus. Thus, the control unit 50 can derive the proportional gain $K_P$ corresponding to $(I_A+I_C)/2$ according to the gain map 55 stored in the storage apparatus.

Therefore, the control unit 50 is capable of changing the proportional gain $K_P$ to be a most suitable value corresponding to the current detected current values $I_A$, $I_C$. Moreover, the control unit 50 is capable of deriving the proportional gain $K_P$ most suitable for adjustment of the phase difference ϕ of the current detected current values $I_A$, $I_C$ from the gain map 55, and therefore capable of adjusting the phase difference ϕ to make the transmitted power P$_{A+C}$ follow the command transmitted power P$_{A+C}$* with desired high accuracy.

Figure 5:
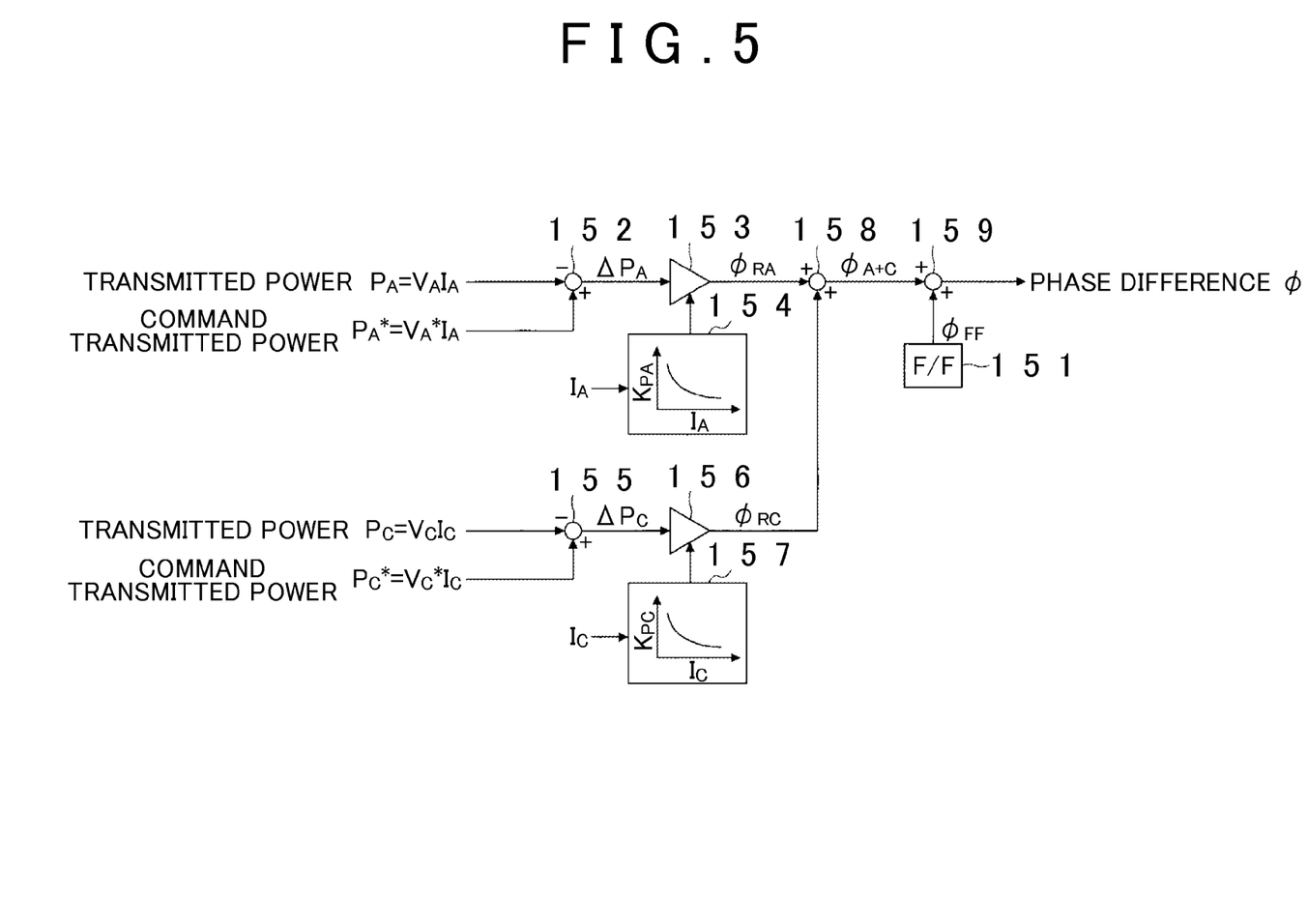
FIG. 5 is a diagram showing a second configuration example of a power feedback control system.

FIG. 5 is a diagram showing a second configuration example of the control unit 50 having a power feedback control system, the power feedback control system adjusting the phase difference ϕ by feeding back transmitted power P$_{A+C}$ transmitted to the first input/output port 60a and the second input/output port 60c from the third input/output port 60b such that the transmitted power P$_{A+C}$ becomes command transmitted power P$_{A+C}$*. The control unit 50 executes a power conversion method for controlling the transmitted power P$_{A+C}$ by adjusting the phase difference ϕ based on the power feedback control system shown in FIG. 5.

The control unit 50 has a subtraction unit 152, a control calculation unit 153, and a gain map 154.

The subtraction unit 152 calculates a deviation ΔP$_A$ between command transmitted power P$_A$* and transmitted power P$_A$ that is feedback input to the control unit 50.

The transmitted power P$_A$ is a part of the transmitted power P (corresponding to P$_{A+C}$ in the case of FIG. 5) transmitted to the primary side conversion circuit 20 from the secondary side conversion circuit 30 via the transformer 400. The transmitted power P$_A$ is equal to the product of a detected voltage value V$_A$ of the port voltage Va output from the first input/output port 60a and a detected current value $I_A$ of the port current Ia output from the first input/output port 60a. At the same acquisition time, the control unit 50 periodically acquires both of the detected current value $I_A$ and the detected voltage value V$_A$ from the sensor unit 70 shown in FIG. 1.

The command transmitted power P$_A$* is a target power value set by using the detected current value $I_A$, and is equal to the product of a target voltage value V$_A$* and the detected current value $I_A$. The target voltage value V$_A$* is a voltage value (for example, 48V) that is set in a working voltage range of the first input/output port 60a, and is a command value set by the control unit 50 or a predetermined apparatus other than the control unit 50.

The control calculation unit 153 performs a proportional control (P control) of deriving an adjustment reference value SRA of the phase difference ϕ by multiplying the deviation ΔP$_A$ by a proportional gain K$_{PA}$. The proportional gain K$_{PA}$ is a control constant to be multiplied by the deviation ΔP$_A$, and is a proportional constant used for a proportional operation (P operation) of changing the phase difference ϕ by changing the adjustment reference value ϕ$_{RA}$ in proportion to the deviation ΔP$_A$.

The control calculation unit 153 may also perform a PI control that is a combination of the above proportional operation of changing the phase difference ϕ in proportion to the deviation ΔP$_A$ and an integral operation (I operation) of changing the phase difference ϕ by changing the adjustment reference value ϕ$_{RA}$ in proportion to integral of the deviation ΔP$_A$. Further, the control calculation unit 153 may also perform a PID control that is a combination of the proportional operation and the integral operation of the PI control and a derivative operation (D operation) of changing the phase difference ϕ by changing the adjustment reference value ϕ$_{RA}$ in proportion to derivative of the deviation ΔP$_A$.

The control calculation unit 153 derives the proportional gain K$_{PA}$ suitable for the detected current value $I_A$ from the gain map 154, and derives the adjustment reference value ϕ$_{RA}$ by multiplying the deviation ΔP$_A$ by the proportional gain K$_{PA}$ that is derived from the gain map 154. The detected current value $I_A$ is a first feedback current value obtained based on the port current Ia flowing to the first input/output port 60a which is a transmission destination of the transmitted power P$_A$. The gain map 154 is a first relationship rule that defines a relationship between the detected current value $I_A$ and the proportional gain K$_{PA}$ suitable for the detected current value $I_A$.

In this way, the control calculation unit 153 performs a proportional operation (P operation) of changing the phase difference ϕ by changing the adjustment reference value ϕ$_{RA}$ in proportion to the deviation ΔP$_A$ using the proportional gain K$_{PA}$ that is derived from the gain map 154.

The control unit 50 has a subtraction unit 155, a control calculation unit 156, and a gain map 157.

The subtraction unit 155 calculates a deviation ΔP$_C$ between command transmitted power P$_C$* and the transmitted power P$_C$ that is feedback input to the control unit 50.

The transmitted power P$_C$ is a part of the transmitted power P (corresponding to P$_{A+C}$ in the case of FIG. 5) transmitted to the primary side conversion circuit 20 from the secondary side conversion circuit 30 via the transformer 400. The transmitted power P$_C$ is equal to the product of a detected voltage value V$_C$ of the port voltage Vc output from the second input/output port 60c and a detected current value $I_C$ of the port current Ic output from the second input/output port 60c. At the same acquisition time, the control unit 50 periodically acquires both of the detected current value $I_C$ and the detected voltage value $V_C$ from the sensor unit 70 shown in FIG. 1. In order to control the transmitted power P with high accuracy, the acquisition times of both of the detected current value $I_C$ and the detected voltage value $V_C$ are preferably the same as the acquisition times of both of the detected current value $I_A$ and the detected voltage value $V_A$.

The command transmitted power $P_C^*$ is a target power value set by using the detected current value k, and is equal to the product of a target voltage value $V_C^*$ and the detected current value $I_C$. The target voltage value $V_C^*$ is a voltage value (for example, 12V) that is set in a working voltage range of the second input/output port 60c, and is a command value set by the control unit 50 or a predetermined apparatus other than the control unit 50.

The control calculation unit 156 performs a proportional control (P control) of deriving an adjustment reference value $\phi_{RC}$ of the phase difference $\phi$ by multiplying the deviation $\Delta P_C$ by a proportional gain $K_{PC}$. The proportional gain $K_{PC}$ is a control constant to be multiplied by the deviation $\Delta P_C$, and is a proportional constant used for a proportional operation (P operation) of changing the phase difference $\phi$ by changing the adjustment reference value $\phi_{RC}$ in proportion to the deviation $\Delta P_C$.

The control calculation unit 156 may also perform a PI control that is a combination of the above proportional operation of changing the phase difference $\phi$ in proportion to the deviation $\Delta P_C$ and an integral operation (I operation) of changing the phase difference $\phi$ by changing the adjustment reference value $\phi_{RC}$ in proportion to integral of the deviation $\Delta P_C$. Further, the control calculation unit 156 may also perform a PID control that is a combination of the proportional operation and the integral operation of the PI control and a derivative operation (D operation) of changing the phase difference $\phi$ by changing the adjustment reference value $\phi_{RC}$ in proportion to derivative of the deviation $\Delta P_C$.

The control calculation unit 153 derives the proportional gain $K_{PC}$ suitable for the detected current value $I_C$ from the gain map 157, and derives the adjustment reference value $\phi_{RC}$ by multiplying the deviation $\Delta P_C$ by the proportional gain $K_{PC}$ that is derived from the gain map 157. The detected current value $I_C$ is a second feedback current value obtained based on the port current Ic flowing to the second input/output port 60c which is a transmission destination of the transmitted power $P_C$. Power of the first input/output port 60a is subject to a voltage conversion in a step-down direction and the power after the voltage conversion is transmitted to the second input/output port 60c. The gain map 157 is a second relationship rule that defines a relationship between the detected current value $I_C$ and the proportional gain $K_{PC}$ suitable for the detected current value $I_C$.

In this way, the control calculation unit 156 performs a proportional operation (P operation) of changing the phase difference $\phi$ by changing the adjustment reference value $\phi_{RC}$ in proportion to the deviation $\Delta P_C$ using the proportional gain $K_{PC}$ that is derived from the gain map 157.

The control unit 50 has an addition unit 158, a feed forward unit 151, and an addition unit 159.

The addition unit 158 calculates an adjustment reference value $\phi_{A+C}$ of the phase difference $\phi$ by adding the adjustment reference value $\phi_{RA}$ and the adjustment reference value $\phi_{RC}$. The feed forward unit 151 generates a control center value $\phi_{FF}$ for transmitting the phase difference $\phi$ of the command transmitted power $P_{A+C}^*$. For example, the feed forward unit 151 generates the control center value $\phi_{FF}$ corresponding to the command transmitted power $P_{A+C}^*$ based on the above Equation 1. The addition unit 159 determines a new phase difference $\phi$ by adding the control center value $\phi_{FF}$ and the adjustment reference value $\phi A_{+C}$. That is, the control unit 50 can adjust the phase difference $\phi$ to make the transmitted power $P_{A+C}$ follow the commanded transmitted power $P_{A+C}^*$.

The gain map 154 is created in advance to enable the proportional gain $K_{PA}$ to be derived which can make the transmitted power $P_{A+C}$ follow the command transmitted power $P_{A+C}^*$ with desired high accuracy in a manner of corresponding to each value of the detected current value $I_A$, and stored in advance in a storage apparatus accessible by the control unit 50. The proportional gain $K_{PA}$ is stored in the storage apparatus such that the larger the detected current value $I_A$ is the smaller a value to be derived from the gain map 154 is.

For example, the proportional gain $K_{PA}$ which can make the transmitted power $P_{A+C}$ follow the command transmitted power $P_{A+C}^*$ with desired high accuracy is measured in advance for each value of the detected current value $I_A$ in a design stage of the power supply circuit 10 or a procedure of checking the power supply circuit 10 manufactured in a factory. Moreover, the gain map 154 that is configured by making the measured proportional gain $K_{PA}$ correspond to each value of the detected current value $I_A$ is stored in the storage apparatus. Thus, the control unit 50 can derive the proportional gain $K_{PA}$ corresponding to the detected current value $I_A$ according to the gain map 154 stored in the storage apparatus.

Similarly, the gain map 157 is created in advance to enable the proportional gain $K_{PC}$ to be derived which can make the transmitted power $P_{A+C}$ follow the command transmitted power $P_{A+C}^*$ with desired high accuracy in a manner of corresponding to each value of the detected current value $I_C$, and stored in advance in a storage apparatus accessible by the control unit 50. The proportional gain $K_{PC}$ is stored in the storage apparatus such that the larger detected current value $I_C$ is the smaller a value to be derived from the gain map 157 is.

For example, the proportional gain $K_{PC}$ which can make the transmitted power $P_{A+C}$ follow the command transmitted power $P_{A+C}^*$ with desired high accuracy is measured in advance for each value of the detected current value $I_C$ in a design stage of the power supply circuit 10 or a procedure of checking the power supply circuit 10 manufactured in a factory. Moreover, the gain map 157 that is configured by making the measured proportional gain $K_{PC}$ correspond to each value of the detected current value $I_C$ is stored in the storage apparatus. Thus, the control unit 50 can derive the proportional gain $K_{PC}$ corresponding to the detected current value $I_C$ according to the gain map 157 stored in the storage apparatus.

Therefore, the control unit 50 is capable of changing the proportional gains $K_{PA}$, $K_{PC}$ to be most suitable values corresponding to the current detected current values $I_A$, $I_C$. Moreover, the control unit 50 is capable of deriving the proportional gains $K_{PA}$, $K_pc$ most suitable for adjustment of the phase differences $\phi$ of the current detected current values $I_A$, $I_C$ from the gain maps 154, 157, and therefore capable of adjusting the phase difference $\phi$ to make the transmitted power $P_{A+C}$ follow the command transmitted power $P_{A+C}^*$ with desired high accuracy.

Further, in the case of FIG. 5, the control unit 50 has gain maps that are capable of deriving the proportional gains most suitable for respective detected current values $I_A$, $I_C$. Therefore, even when the port current Ia and the port current Ic are greatly changed independently of each other (for example, even when one port current increases and the other port current decreases), the control unit 50 is capable of adjusting the phase difference φ to make the transmitted power $P_{A+C}$ follow the command transmitted power $P_{A+C}^*$ with desired high accuracy.

Figure 6:
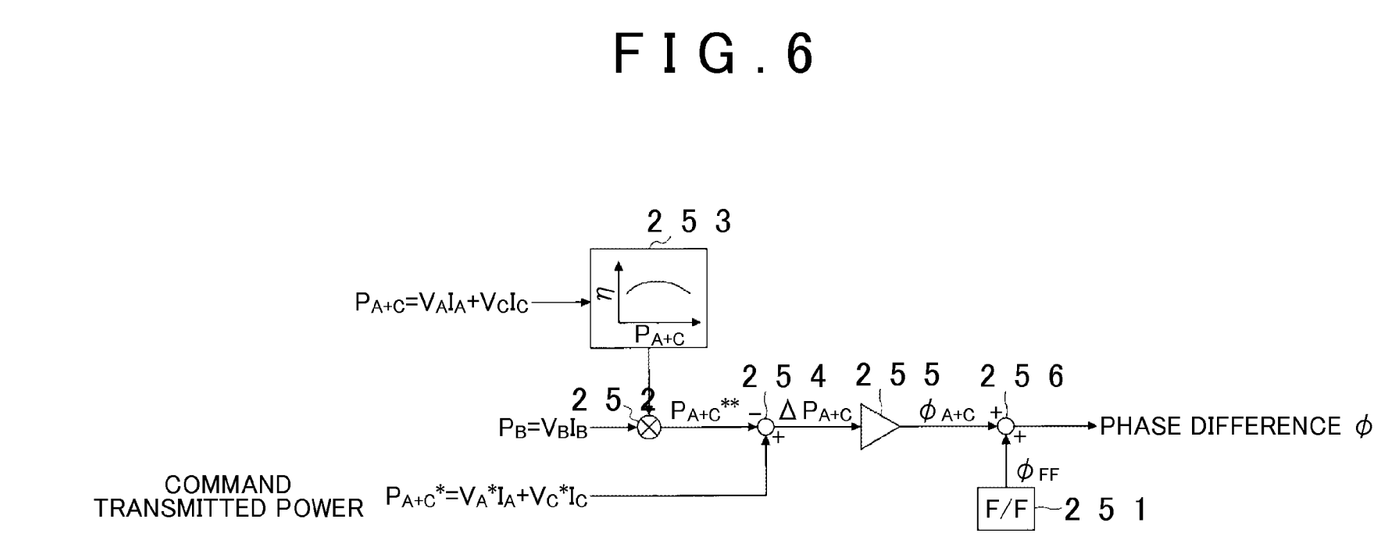
FIG. 6 is a diagram showing a third configuration example of a power feedback control system.

FIG. 6 is a diagram showing a third configuration example of the control unit 50 having a power feedback control system, the power feedback control system adjusting the phase difference by feeding back transmitted power $P_{A+C}$ transmitted to the first input/output port 60a and the second input/output port 60c from the third input/output port 60b such that the transmitted power $P_{A+C}$ becomes command transmitted power $P_{A+C}^*$. The control unit 50 executes a power conversion method for controlling the transmitted power $P_{A+C}$ by adjusting the phase difference φ based on the power feedback control system shown in FIG. 6.

The control unit 50 has an efficiency map 253, a multiplication unit 252, a subtraction unit 254, a control calculation unit 255, a feed forward portion 251, and an addition unit 256.

In FIG. 6, the control unit 50 calculates an assumed value $P_{A+C}^{**}$ of the transmitted power $P_{A+C}$ that is transmitted to the first input/output port 60a and the second input/output port 60c according to input power $P_B$ that is input to the transformer 400 from the third input/output port 60b and a transmission efficiency η.

The input power $P_B$ is equal to the product of a detected voltage value $V_B$ of the port voltage Vb input from the third input/output port 60b and a detected current value $I_B$ of the port current Ib input from the third input/output port 60b. At the same acquisition time, the control unit 50 periodically acquires both of the detected current value $I_B$ and the detected voltage value $V_B$ from the sensor unit 70 shown in FIG. 1. The input power $P_B$ is port power of the third input/output port 60b which is a transmission destination of the transmitted power $P_{A+C}$.

The transmission efficiency η is a conversion efficiency of the transmitted power between the primary side conversion circuit 20 and the secondary side conversion circuit 30, and is expressed by a ratio of output power to input power. Among the primary side ports of the primary side conversion circuit 20 and the secondary ports of the secondary side conversion circuit 30, when input power that is input from one port is defined as Pin, output power that is output from the other port is defined as Pout, an input voltage that is input from the one port is defined as Vin, an output voltage that is output from the other port is defined as Vout, an input current that is input from the one port is defined as Iin, and an output current that is output from the other port is defined as Iout, the transmission efficiency η can be expressed as $$\eta = Pout/Pin = (Vout \times Iout)/(Vin \times Iin) \quad \text{Equation 2}$$

For example, transmitted power $P_A$ after a voltage conversion of the input power $P_B$ that is input from the third input/output port 60b is output to the first input/output port 60a by performing the voltage conversion, and transmitted power $P_C$ after a voltage conversion of the transmitted power $P_A$ of the first input/output port 60a is output to the second input/output port 60c by performing the voltage conversion. In this case, according to equation 2, the transmission efficiency η can be expressed as $$\eta = P_{A+C}/P_B = (P_A + P_C)/P_B = (V_A I_A + V_C I_C)/V_B I_B \quad \text{Equation 3}$$

It should be noted that Equation 3 is an equation in the case of not using the fourth input/output port 60d, with the power that is input/output in the fourth input/output port 60d being zero (for example, an configuration in which the secondary side low voltage system load 61d and the capacitor C4 are absent).

Since the value of the transmission efficiency η has a property that varies according to the magnitude of the transmitted power $P_{A+C}$, in FIG. 6, the efficiency map 253 that defines a relationship between the transmission efficiency η and the transmitted power $P_{A+C}$ is created in advance. The control unit 50 derives the transmission efficiency η suitable for the current transmitted power $P_{A+C}$ that is feedback input to the control unit 50 from the efficiency map 253. Moreover, the control unit 50 can calculate the assumed value $P_{A+C}^{**}$ of the current transmitted power $P_{A+C}$ by the multiplication unit 252 multiplying the transmission efficiency η that is derived from the efficiency map 253 by the current input power $P_B$ that is feedback input to the control unit 50.

The transmitted power $P_{A+C}$ that is feedback input to the control unit 50 is a feedback power value obtained based on the port currents Ia, Ic and the port voltages Va, Vc of the first input/output port 60a and the second input/output port 60c which are transmission destinations of the transmitted power $P_{A+C}$. The efficiency map 253 is a relationship rule that defines a relationship between the transmitted power $P_{A+C}$ and the transmission efficiency η suitable for the transmitted power $P_{A+C}$.

The subtraction unit 254 calculates a deviation $\Delta P_{A+C}$ between a command transmitted power $P_{A+C}^*$ and the assumed value $P_{A+C}^{**}$ of the transmitted power $P_{A+C}$. The command transmitted power $P_{A+C}^*$ is a target power value that is set by using the detected current value $I_A$ and the detected current value $I_C$, and is equal to the sum of the product of a target voltage value $V_A^*$ and the detected current value $I_A$ and the product of a target voltage value $V_C^*$ and the detected current value $I_C$.

The control calculation unit 255 performs a proportional control (P control) of deriving an adjustment reference value $\phi_{A+C}$ of the phase difference φ by multiplying the deviation $\Delta P_{A+C}$ by a proportional gain $K_P$. The proportional gain $K_P$ is a control constant to be multiplied by the deviation $\Delta P_{A+C}$, and is a proportional constant used for a proportional operation (P operation) of changing the phase difference φ by changing the adjustment reference value $\phi_{A+C}$ in proportion to the deviation $\Delta P_{A+C}$.

The control calculation unit 255 may also perform a PI control that is a combination of the above proportional operation of changing the phase difference φ in proportion to the deviation $\Delta P_{A+C}$ and an integral operation (I operation) of changing the phase difference φ by changing the adjustment reference value $\phi_{A+C}$ in proportion to integral of the deviation $\Delta P_{A+C}$. Further, the control calculation unit 53 may also perform a PID control that is a combination of the proportional operation and the integral operation of the PI control and a derivative operation (D operation) of changing the phase difference φ by changing the adjustment reference value $\phi_{A+C}$ in proportion to derivative of the deviation $\Delta P_{A+C}$.

In this way, the control calculation unit 255 perform a proportional operation (P operation) of changing the phase difference φ by changing the adjustment reference value $\phi_{A+C}$ in proportion to the deviation $\Delta P_{A+C}$ using the transmission efficiency η that is derived from the efficiency map 253.

The feed forward unit 251 generates a control center value $\phi_{FF}$ for transmitting the phase difference $\phi$ of the command transmitted power $P_{A+C}^*$. For example, the feed forward unit 251 generates the control center value $\phi_{FF}$ corresponding to the command transmitted power $P_{A+C}^*$ based on the above Equation 1. The addition unit 256 determines a new phase difference $\phi$ by adding the control center value $\phi_{FF}$ and the adjustment reference value $\phi_{A+C}$. That is, the control unit 50 can adjust the phase difference $\phi$ to make the transmitted power $P_{A+C}$ follow the command transmitted power $P_{A+C}^*$.

The efficiency map 253 is created in advance to enable the transmission efficiency $\eta$ to be derived which can make the transmitted power $P_{A+C}$ follow the command transmitted power $P_{A+C}^*$ with desired high accuracy in a manner of corresponding to each value of the transmitted power $P_{A+C}$, and stored in advance in a storage apparatus accessible by the control unit 50. The transmission efficiency $\eta$ is stored in the storage apparatus such that the smaller the transmitted power $P_{A+C}$ is the smaller a value to be derived from the efficiency map 253 is.

For example, the transmission efficiency $\eta$ which can make the transmitted power $P_{A+C}$ follow the command transmitted power $P_{A+C}^*$ with desired high accuracy is measured in advance for each value of the transmitted power $P_{A+C}$ in a design stage of the power supply circuit 10 or a procedure of checking the power supply circuit 10 manufactured in a factory. Moreover, the efficiency map 253 that is configured by making the measured transmission efficiency $\eta$ correspond to each value of the transmitted power $P_{A+C}$ is stored in the storage apparatus. Thus, the control unit 50 can derive the transmission efficiency $\eta$ corresponding to the transmitted power $P_{A+C}$ according to the efficiency map 253 stored in the storage apparatus.

Therefore, the control unit 50 is capable of deriving the transmission efficiency $\eta$ most suitable for adjustment of the phase difference $\phi$ of the current transmitted power $P_{A+C}$ from the efficiency map 253, and therefore capable of adjusting the phase difference $\phi$ using a certain proportional gain $K_P$ to make the transmitted power $P_{A+C}$ follow the command transmitted power $P_{A+C}^*$ with desired high accuracy.

An embodiment of the power conversion apparatus and power conversion method was described above, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

Further, in FIG. 1, although the primary side low voltage system power supply 62c is connected to the second input/output port 60c, the power supply may be connected to neither the first input/output port 60a nor the second input/output port 60c.

Further, the present invention is suitable for a power conversion apparatus that has a plurality of, at least three or more, input/output ports and is capable of converting power between any two input/output ports of the plurality of, at least three or more, input/output ports. For example, the present invention is also suitable for the power supply apparatus configured to not include any one input/output port of the four input/output ports as illustrated in FIG. 1.

Further, in the above description, the primary side may be defined as the second side, and the second side may be defined as the primary side. In the above description, although a case that the transmitted power P is transmitted to the primary side port from the secondary side port has been illustrated as an example, the above description can be applied to the case that the transmitted power P is transmitted to the secondary side port from the primary side port.

Further, for example, the relationship. rule that defines the relationship between the feedback value and the control constant is not limited to a map, and may be a regression equation that defines the relationship between the feedback value and the control constant.

Further, the control unit 50 may also be configured to control the transmitted power P by deriving an integral gain suitable for the feedback current value from a relationship rule that defines a relationship between the feedback current value and the integral gain and adjusting the phase difference $\phi$ by using the integral gain derived from the relationship rule. In this case, the control unit 50 perform an integral operation (I operation) of changing the phase difference $\phi$ in proportion to integral of a deviation $\Delta P$ between the transmitted power P and command transmitted power P* using the integral gain that is derived from the relationship rule.

Further, the control unit 50 may also be configured to control the transmitted power P by deriving a derivative gain suitable for the feedback current value from a relationship rule that defines a relationship between the feedback current value and the derivative gain and adjusting the phase difference $\phi$ by using the derivative gain derived from the relationship rule. In this case, the control unit 50 perform a derivative operation (D operation) of changing the phase difference $\phi$ in proportion to derivative of the deviation $\Delta P$ between the transmitted power P and the command transmitted power P* using the derivative gain that is derived from the relationship rule.

What is claimed is:

1. A power conversion apparatus comprising:
    a primary side circuit having a primary side port;
    a secondary side circuit having a secondary side port; and
    a control unit configured to derive a control constant suitable for a feedback value according to a relationship rule between the feedback value and the control constant, and adjust a phase difference between the primary side circuit and the secondary side circuit using the control constant that is derived from the relationship rule, so as to control transmitted power that is transmitted between the primary side circuit and the secondary side circuit, the feedback value being obtained based on current flowing, to the primary side port or the secondary side port.

2. The power conversion apparatus according to claim 1, wherein
    the control unit performs a proportional operation of changing the phase difference in proportion to a deviation between the transmitted power and command transmitted power using the control constant that is derived from the relationship rule.

3. The power conversion apparatus according to claim 2, wherein the command transmitted power is set by using a detected value of the current.

4. The power conversion apparatus according to claim 3, wherein the control constant is a proportional gain to be multiplied by the deviation.

5. The power conversion apparatus according to claim 4, wherein larger the current is, the smaller a value of the proportional gain to be derived is.

6. The power conversion apparatus according to claim 4, wherein one of the primary side port and the secondary side port has a first transmission destination port which is a transmission destination of the transmitted power and a second transmission destination port which performs a voltage conversion to the power of the first transmission destination port and to which the power after the voltage conversion is transmitted, the relationship rule includes a first relationship rule between a first feedback current value that is obtained based on current flowing to the first transmission destination port and a first proportional gain suitable for the first feedback current value, and a second relationship rule between a second feedback current value that is obtained based on current flowing to the second transmission destination port and a second proportional gain suitable for the second feedback current value, and the control unit adjusts the phase difference by using the first proportional gain that is derived from the first relationship rule and the second proportional gain that is derived from the second relationship rule so as to control the transmitted power.

7. The power conversion apparatus according to claim 2, wherein the control constant is a transmission efficiency of the transmitted power that is transmitted between the primary side circuit and the secondary side circuit.

8. The power conversion apparatus according to claim 7, wherein the relationship rule defines a relationship between a feedback power value and the transmission efficiency suitable for the feedback power value, and the feedback power value is obtained based on current flowing to a transmission destination port of the transmitted power and a voltage of the transmission destination port.

9. The power conversion apparatus according to claim 8, wherein the deviation is a difference between an assumed value of the transmitted power and the command transmitted power, and the assumed value is the product of power of a transmission source port of the transmitted power and the transmission efficiency that is derived from the relationship rule.

10. The power conversion apparatus according to claim 1, wherein the relationship rule is a map.

11. A power conversion method comprising:

deriving a control constant suitable for a feedback value according to a relationship rule between the feedback value and the control constant, wherein the feedback value is obtained based on current flowing to a primary side port of a primary side circuit or a secondary side port of a secondary side circuit, and adjusting a phase difference between the primary side circuit and the secondary side circuit using the control constant that is derived from the relationship rule, so as to control transmitted power that is transmitted between the primary side circuit and the secondary side circuit.

* * * * *